US009718718B2

United States Patent
Wintzer et al.

(10) Patent No.: US 9,718,718 B2
(45) Date of Patent: Aug. 1, 2017

(54) METHOD FOR PRODUCING A GLASS STOPPER FOR SEALING BOTTLES

(71) Applicant: DOCTER OPTICS SE, Neustadt an der Orla (DE)

(72) Inventors: Wolfram Wintzer, Jena (DE); Lars Arnold, Neustadt (DE); Hagen Goldammer, Jena (DE); Sandro Plietzsch, Linda (DE)

(73) Assignee: Doctor Optics SE, Neustadt an der Orla (DE)

( * ) Notice: Subject to any disclaimer, the term of this patent is extended or adjusted under 35 U.S.C. 154(b) by 91 days.

(21) Appl. No.: 14/780,810

(22) PCT Filed: Mar. 17, 2014

(86) PCT No.: PCT/EP2014/000716
§ 371 (c)(1),
(2) Date: Sep. 28, 2015

(87) PCT Pub. No.: WO2014/177239
PCT Pub. Date: Nov. 6, 2014

(65) Prior Publication Data
US 2017/0044042 A1    Feb. 16, 2017

(30) Foreign Application Priority Data

Apr. 29, 2013 (DE) .................. 10 2013 007 311

(51) Int. Cl.
*C03B 11/08*    (2006.01)
(52) U.S. Cl.
CPC .......... *C03B 11/08* (2013.01); *C03B 2215/50* (2013.01); *C03B 2215/66* (2013.01)

(58) Field of Classification Search
CPC ... B29C 43/184; B29C 43/021; B29C 43/361; B29C 43/00–43/58; B29K 2309/08; B29K 2709/08; B29K 2509/08; C03B 11/08; C03B 2215/50; C03B 2215/66
See application file for complete search history.

(56) References Cited

FOREIGN PATENT DOCUMENTS

| DE | 10320345 | 5/2004 |
| EP | 1565410 | 11/2003 |
| EP | 1954637 | 8/2008 |
| GB | 302193 | 12/1928 |
| WO | 2007062830 | 6/2007 |
| WO | 2009109209 | 9/2009 |
| WO | 2014019713 | 2/2014 |

OTHER PUBLICATIONS

Office Action issued on Jan. 16, 2014 in German Application No. 102013007311.1.
International Search Report and Written Opinion, Application No. PCT/EP2014/000716, dated Jul. 8, 2014.
International Preliminary Report on Patentability, Application No. PCT/EP2014/000716, dated Nov. 12, 2015.
English translation of International Preliminary Report on Patentability, Application No. PCT/EP2014/000716, dated Nov. 12, 2015.

*Primary Examiner* — Jodi C Franklin
(74) *Attorney, Agent, or Firm* — Barnes & Thornburg LLP

(57) ABSTRACT

The invention relates to a method for producing a glass stopper with a head portion for sealing bottles, more particularly bottles for wine and sparkling wine, wherein an upper mold and a lower mold are provided.

23 Claims, 4 Drawing Sheets

METHOD FOR PRODUCING A GLASS STOPPER FOR SEALING BOTTLES

CROSS REFERENCE TO RELATED APPLICATIONS

This application is a U.S. nationalization under 35 U.S.C. §371 of International Application No. PCT/EP2014/000716, filed Mar. 17, 2014, which claims priority to German Application No. 102013007311.1 filed Apr. 29, 2013.

FIELD OF THE INVENTION

The invention relates to a method for producing a glass stopper provided with a head section, for sealing bottles, in particular bottles for wine and sparkling wine, wherein a top mold and a bottom mold are provided.

BACKGROUND INFORMATION

EP 1 565 410 B1 discloses an installation for producing a glass stopper provided with a head section, for sealing bottles, in particular bottles for wine and sparkling wine, the installation including a multi-part mold determining the negative contour of the stopper to be manufactured in the closed condition and having a basic part and a top part; a feeder system for supplying molten glass into the mold; pressure exerting means having a plurality of stations; as well as an arrangement for removing and further handling the manufactured glass stoppers, wherein the basic section has a clearance or recess corresponding to a first partial length of the stopper, wherein there is provided, between the basic section and the top section, a medial section of two partial mold elements being movable relative to each other and in a vertical direction with respect to the longitudinal axis of the mold, and being configured to be coupled in a self-centring manner, which (two) partial mold elements, in their coupled state and when closely adjacent to or abutting the basic section, define a hollow corresponding to a second partial length of the stopper as well as to at least a main portion of the head section, and wherein the top section closing the head section hollow restricts the planar surface of the head section by means of a central pressure exerting or press ram which is axially movable relative to the top section, and wherein the press ram serves for configuring a recess or impression in the head section of the stopper for compensating tolerances. In web page www.vinolok.cz/new/en.html being associated with the owner of the German part of EP 1 565 410 B1, a corresponding glass stopper is offered.

EP 1 954 637 B1 discloses a method for manufacturing glass stoppers, wherein a portion unit of liquid or pasty glass is filled into a negative mold of a glass stopper to be produced, wherein the depression is applied to the negative mold for a period of time which suffices for the liquid or pasty glass to be sucked into the negative mold and to be transferred into a dimensionally exact abutment against the wall of the negative mold. Moreover, it is provided for that an outer surface of the glass present in the negative mold is subjected to heat treatment, and that the glass stopper is cooled down and demolded.

GB 302 193 discloses an apparatus for producing a glass stopper, by means of which apparatus a blank or preform is manufactured from which a portion is severed by means of a blade.

SUMMARY

According to an aspect of the invention a method for producing a glass stopper provided with a head section, for sealing bottles, in particular bottles for wine and sparkling wine, wherein a top mold and a bottom mold are provided, wherein the bottom mold comprises a lower bottom mold piece, wherein the bottom mold comprises an, for example, annular and/or one-piece upper bottom mold piece for molding at least a main portion of the head section or a portion of the head section, wherein the bottom mold may comprise at least one medial bottom mold piece for molding at least one portion of the length of the stopper and/or for molding at least one part or portion of the length of the stopper having a shape configured for (receiving or fitting) a seal, said medial bottom mold piece being arranged between the lower bottom mold piece and the upper bottom mold piece, wherein the medial bottom mold piece comprises a first mold piece/mold part and at least one second mold piece/mold part, wherein liquid glass is supplied to the bottom mold, wherein it is, in particular, provided for that subsequently the top mold and the bottom mold are moved towards each other (essentially) in a horizontal direction or in a direction having a horizontal component of direction, wherein the glass stopper is pressed, in particular press-molded from the liquid glass by means of the top mold and the bottom mold or by moving the top mold and the bottom mold towards each other (essentially) in a vertical direction, for example by means of a pressure force or capacity of no less than 100 N and/or and by a pressure force of no more than 1.500 N, wherein it is, for example, provided for that that the top mold and the bottom mold form a closed mold entity, and wherein the first mold piece and the second mold piece are subsequently moved apart from one another (essentially) in a horizontal direction.

The term "liquid glass" is, for example, to comprise pasteous glass. Glass is particularly inorganic glass. Glass is particularly silicate glass. Glass is e.g. B270® or DOCTAN®. Glass is e.g. glass as has been described in PCT/EP2008/010136. Glass may comprise 0.2 to 2% by weight $Al_2O_3$,
0.1 to 1% by weight $Li_2O$,
0.3, for example 0.4 to 1.5% by weight $Sb_2O_3$,
60 to 75% by weight $SiO_2$,
3 to 12% by weight $Na_2O$,
3 to 12% by weight $K_2O$, and
3 to 12% by weight $CaO$.

The term press-molding (also termed bright-pressing, blank-molding or blank-pressing, in technical and patent literature) is, in particular, to be understood in a manner that a surface is subjected to pressure such that any subsequent finishing or post-treatment of the contour of this surface may be dispensed with, or does not apply, or will not have to be provided for, respectively. Consequently, it is particularly provided for that, after press-molding, a press-molded surface will not be ground, (i.e. it will not [have to] be subjected to treatment by grinding). The term press-molding is, in particular, to be understood in a manner that a glass stopper is completely pressed (which does not necessarily mean to exclude the adding of accessories and/or sealing means). The term press-molding is, for example, to be understood in a manner that after pressing no portions are removed by any actions such as grinding, milling-off or cutting-off.

The top mold and the bottom mold can be made to move towards each other in that the top mold is made to move towards the bottom mold and/or the bottom mold is made to move towards the top mold (vertically or horizontally, respectively). For exerting pressure or press-molding, respectively, the top mold and the bottom mold are made to move towards each other until they abut or touch each other or form a closed mold entity. (When the mold entity is closed according to its purpose of use, the bottom mold is present below the top mold. When, according to its purpose of use, the mold entity is closed the lower bottom mold piece is present below the upper bottom mold piece. When the mold entity is closed according to its purpose of use, the medial bottom mold piece is present below the upper bottom mold piece. When the mold entity is closed according to its purpose of use, the lower bottom mold piece is present below the medial bottom mold piece)

The term "one-piece" is, in particular, to mean "one-part" (monolithical) (which, in particular, refers to the glass part and does not mean to exclude that accessories and/or sealings [to the glass part] [may] be added). "One-piece" does, in particular, not mean to exclude that the pressed or readily pressed glass stopper, respectively, may yet be provided with a sealing after pressing or press-molding, respectively. "One-piece" may e.g. mean that a mold piece/part/portion, respectively, forms a one-piece (negative) mold area in a plane being orthogonal with respect to the longitudinal axis of the glass stopper.

The term "annular" is, for example, not restricted to circular perimeters. The term "annular", when taken with regard to a mold piece, for example refers to particularly the molding or casting portion or the negative mould, respectively, or to an internal area for guiding the other mold piece. The term "annular", when taken with regard to the upper bottom mold piece, for example refers to the molding or casting portion or the negative mold, respectively, of the upper bottom mould piece. Annular, when taken with regard to the upper bottom mold piece, for example means that the upper bottom mold piece, with its molding or casting portion encloses the glass stopper (in a plane which is orthogonal with regard to the longitudinal axis of the glass stopper). A portion or main portion, respectively, of the head section refers particularly to an extension of the head section in the direction of the longitudinal axis of the glass stopper (external circumference). A length of the stopper refers, in particular, to that portion of the glass stopper which is arranged, when the glass stopper is being used in accordance with its purpose, within the neck of the bottle. A length of the stopper refers, for example when the glass stopper is being used according to its purpose, to an extension of that portion of the glass stopper which is arranged within the bottle neck, which extension is in the direction of the longitudinal axis of the glass stopper.

A fixation formation or molding may be an indentation, a recess, a bulge or a dent, or may comprise the same. A fixation formation or molding may also well be a thread-shaped indentation, a recess, a bulge or a dent having the length of the stopper, or may comprise such shape. A glass stopper having a fixation formation is, for example, being shown in web page www.oenologic.com/product-information. A sealing particularly comprises elastic material or consists thereof. A sealing may be a one-piece or a plural-piece structure. A sealing may, for example, be a monolithic sealing, as is being disclosed in web page www.vinolok.cz/new/en.html. A sealing may, for example, be a multi-piece sealing, as is being disclosed in web page www.oenologic.com/product-information.

In an embodiment of the invention, the lower bottom mold piece is mounted in a floating manner. In a further embodiment of the invention, the lower bottom mold piece is configured in a one-piece (or monolithic) manner. In a further embodiment of the invention, the lower bottom mold piece is configured such that it forms a part of the length of the stopper.

In a further embodiment of the invention, the transparent material has a viscosity of no more than $10^{4,5}$ dPas, immediately before molding, i.e. before exerting pressure.

In a further embodiment of the invention, the glass, before and/or during exerting pressure or press-molding, is drawn into the bottom mold (in a liquid state) by means of depression. In a furthermore embodiment of the invention, the depression is pressure of no more than 0.5 bar. In a further embodiment of the invention, the depression is pressure of no less than 0.1 bar. It is, for example, provided for that in the lower bottom mold piece channels or gaps are provided in order to generate depression in the bottom mold.

In a further embodiment of the invention, the top mold and/or the bottom mold or the lower bottom mold piece and/or the medial bottom mold piece is/are heated. In a further embodiment of the invention, the bottom mold or the lower bottom mold piece and/or the medial bottom mold piece is/are heated before and/or during exerting pressure or press-molding.

In a further embodiment of the invention, the top mold comprises a die and a sleeve surrounding the die, for molding a part of the top side of the head section. In a further embodiment of the invention, the die, during exerting pressure or press-molding, is pressed or pushed into the head section. The terms "heading tool", or "press ram" may be considered as alternative terms for the term "die".

In a further embodiment of the invention, (for removing the glass stopper from the mold) after exerting pressure or press-molding, the glass stopper is drawn out of the bottom mold by means of depression generated in the top mold or in the sleeve, respectively. In an embodiment of the invention, (for removing the glass stopper from the mold) overpressure is generated, for example simultaneously, for example for less than 0.5 s, in the bottom mold, or in the lower bottom mold piece, or in the channels of the lower bottom mold piece, respectively. In a further embodiment of the invention, the glass stopper is thereafter or after removal from the mold, respectively, cooled down in a suspended state.

According to another aspect of the invention a method for producing a glass stopper provided with a head section, for sealing bottles, in particular bottles for wine and sparkling wine, wherein a top mold and a bottom mold are provided, wherein the bottom mold comprises a press ram and an annular (for example one-piece) bottom mold piece for molding at least a main portion of the head section or a portion of the head section, wherein it is, in particular, provided for that the bottom mold piece encloses the press ram, wherein the top mold comprises an upper top mold piece and, in particular, a particularly annular and/or one-piece/monolithic lower top mold piece, in particular for molding a portion of the length of the stopper, and/or for molding at least a portion of the head section, wherein the top mold may comprise at least one medial top mold piece for molding a part of the length of the stopper, and/or for molding at least a part of the length of the stopper including a fixation formation (configured) for a sealing, said at least one medial top mold piece arranged between the lower top mold piece and the upper top mold piece, wherein the medial top mold piece comprises a first mold piece and at least one second mold piece, wherein liquid glass is supplied to the bottom mold, wherein it is, in particular, provided for that subsequently the top mold and the bottom mold are moved towards each other (essentially) horizontally or having a horizontal component of direction, and wherein the glass stopper is pressed and/or press-molded from the liquid glass by means of the bottom mold and the top mold. Most surprisingly, it can be shown that by this process, when compared with the aforementioned method, it is possible to increase the ratio of unobjectionable manufactured pieces considerably.

In an embodiment of the invention, the upper top mold part/piece/portion is mounted in a floating manner. In a further embodiment of the invention, the upper top mold piece is configured monolithic. In a further embodiment of the invention, the upper top mold piece is configured such that it forms one part of the length of the stopper.

In a further embodiment of the invention, the glass has a viscosity of no more than $10^{4,5}$ dPas, immediately before molding, i.e. before exerting pressure.

In a further embodiment of the invention, the glass, before and/or during exerting pressure or press-molding, is drawn into the top mold (in a liquid state) by means of depression. In a furthermore embodiment of the invention, the depression is a pressure of no more than 0.5 bar. In a further embodiment of the invention, the depression is a pressure of no less than 0.1 bar. It is, for example, provided for that in the upper top mold piece an annular channel is configured in order to generate depression in the top mold or in the upper top mold piece, respectively.

In a further embodiment of the invention, the bottom mold (including the liquid glass) and the top mold are moved towards each other (essentially) in a vertical direction before exerting pressure or before press-molding. In a further embodiment of the invention, and before exerting pressure or before press-molding, the bottom mold (including the liquid glass) and the top mold are moved towards each other (essentially) in a vertical direction such that they form a closed mold entity. (With the mold entity closed according to its purpose of use, the bottom mold is present below the top mold. With the mold entity closed according to its purpose of use, the lower top mold piece is present below the upper top mold piece. With the mold entity closed according to its purpose of use, the medial top mold piece is present below the upper top mold piece. With the mold entity closed according to its purpose of use, the lower top mold piece is present below the medial bottom mold piece). In a further embodiment of the invention, the press ram is made to move upwardly and/or pressed or pushed into the head section simultaneously and/or subsequently or thereafter, for the purpose of exerting pressure or press-molding, for example with a pressing force of no less than 100 N and/or with a pressing force of no more than 1.500 N.

In a further embodiment of the invention, the bottom mold and the top mold (for example including the molded glass stopper) are subsequently or thereafter moved apart from one another. In a further embodiment of the invention, the first mold piece and the second mold piece are, subsequently or thereafter moved apart from one another or moved apart from one another (essentially) in a horizontal direction. In a further embodiment of the invention it is provided for that the readily molded glass stopper is subsequently and/or thereafter put down, discharged or ejected. To this end, it is, for example, provided for that the depression is the upper top mold or in the annular gap thereof is substituted by normal pressure or overpressure. In a further embodiment of the invention, it is provided for that the finally press-molded glass stopper is (subsequently and/or thereafter) provided with a particularly one-piece/monolithic seal.

In a further embodiment of the invention, the top mold and the lower top mold piece and/or the medial top mold piece are heated. In a further embodiment of the invention, the top mold and the lower top mold piece and/or the medial top mold piece are heated before and/or while exerting pressure, bright- or blank-pressing, or press-molding.

The invention provides for an improved method for producing glass stoppers for sealing bottles, in particular bottles for wine and sparkling wine. The invention provides, in particular, for reducing the time of a manufacturing cycle in the of such glass stoppers. The invention provides for producing more complex or as such complex, respectively, glass stoppers for sealing bottles, in particular bottles for wine and sparkling wine. The invention provides for producing glass stoppers for sealing bottles, in particular wine bottles or sparkling wine bottles, respectively, having particularly slim partial dimensions of the stopper. The invention provides for a method for producing lengthy glass stoppers for sealing bottles, in particular wine bottles or sparkling wine bottles, respectively. Moreover, the invention provides for a method particularly appropriate for producing glass stoppers having fixation configurations in the shape or form of one or several bulges or convexities, as are shown, for example, in web page www.oenologic.com/product-information.

DETAILED DESCRIPTION

Figure 1:
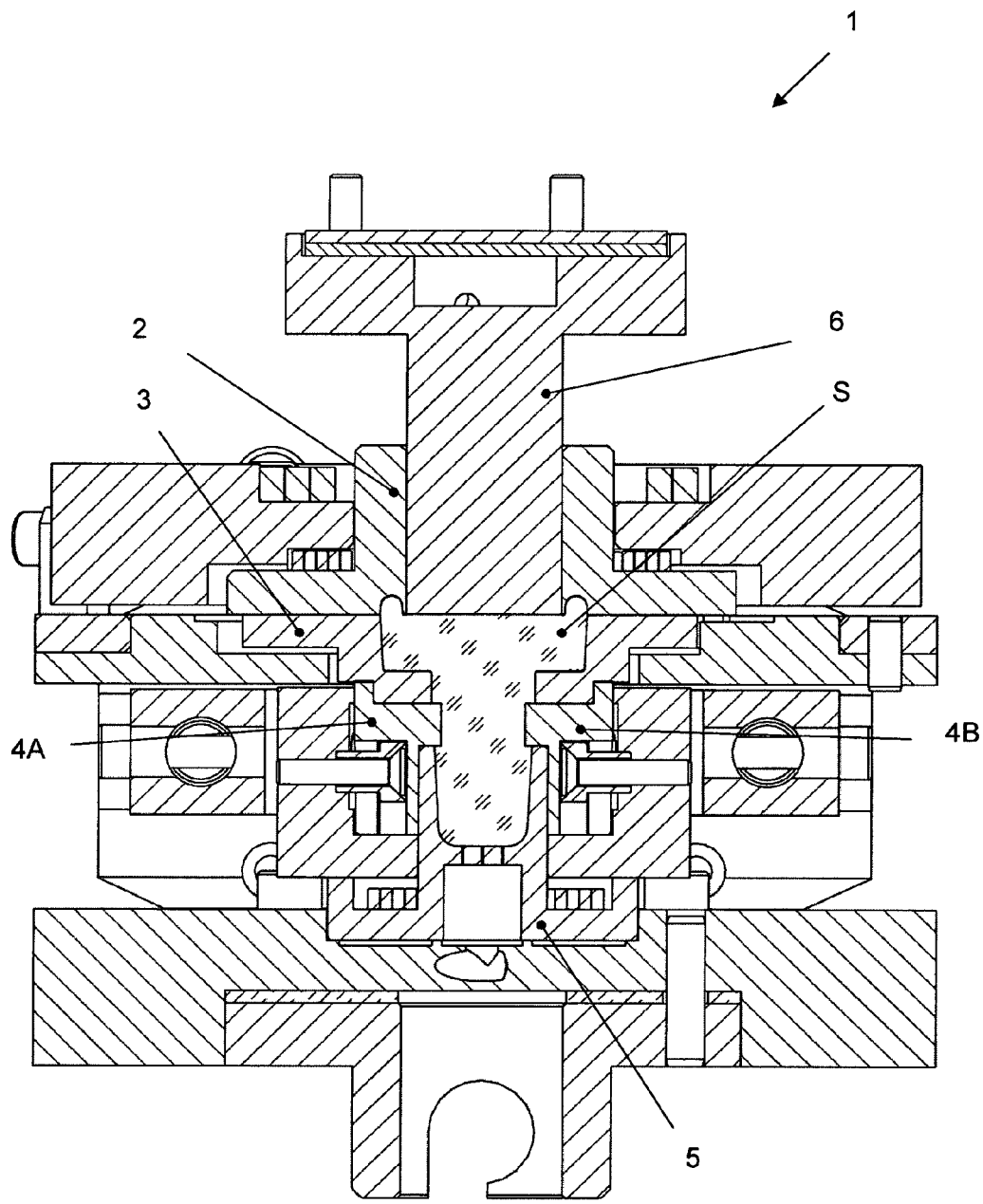
FIG. 1 shows an example of an embodiment of a closed mold entity of a multi-station press for implementing a method for the production of a glass stopper for sealing bottles and provided with a head section.

FIG. 1 shows an example of embodiment of a closed mold entity (total or entire mold) 1 of and/or in a multi-station press for implementing a method for manufacturing a glass stopper S for sealing bottles, in particular bottles for wine and sparkling wine, said bottles being provided with a head section/head part. The mold entity 1 comprises a top mold including a pressure exerting or press ram 6 and a sleeve 2, which encloses the press ram 6. Moreover, the mold entity 1 comprises a bottom mold including an annular monolithic upper bottom mold piece 3 for molding at least the main portion of the head section of the glass stopper S, a medial bottom mold piece (for molding a fixation configuration or shape for a seal), which comprises a mold piece (or mold part) 4A and a mold piece (or mold part) 4B, as well as a lower bottom mold piece 5. Channels for generating a depression in the bottom mold or in the mold entity 1 are arranged in the lower bottom mold piece 5. The partial molds 4A and 4B are arranged to be moved or shifted against each other horizontally such that they can be moved to open and to close.

For manufacturing the glass stopper S, the mold pieces/ mold parts 4A and 4B are first of all made to move towards and against each other so that they result in a closed mold ring. Subsequently, a drop of liquid glass is supplied to the bottom mold. Thereafter, the bottom mold is moved against the sleeve 2, so that the sleeve 2 abuts the upper bottom mold piece 3. Subsequently the press ram 6 is moved in the direction towards the bottom mold, so that it presses into the head section of the glass stopper S. Simultaneously, a depression is generated in the bottom mold by means of the channels within the lower bottom mold piece 5.

For removing the press molded glass stopper S, the mold pieces/parts 4A and 4B are first moved apart. Subsequently, a depression is generated in the top mold, by means of which depression the glass stopper may be lifted out from the bottom mold by moving the bottom mold downwardly. In an embodiment of the invention, a depression is simultaneously generated in the channels of the lower bottom mold piece 5. The top mold including the sucked-in glass stopper S is supplied to a removing or discharging station, and the glass stopper S is stripped off by mechanically shifting the sleeve 2 relative to the press ram 6 while simultaneously generating a depression in the top mold.

Figure 2:
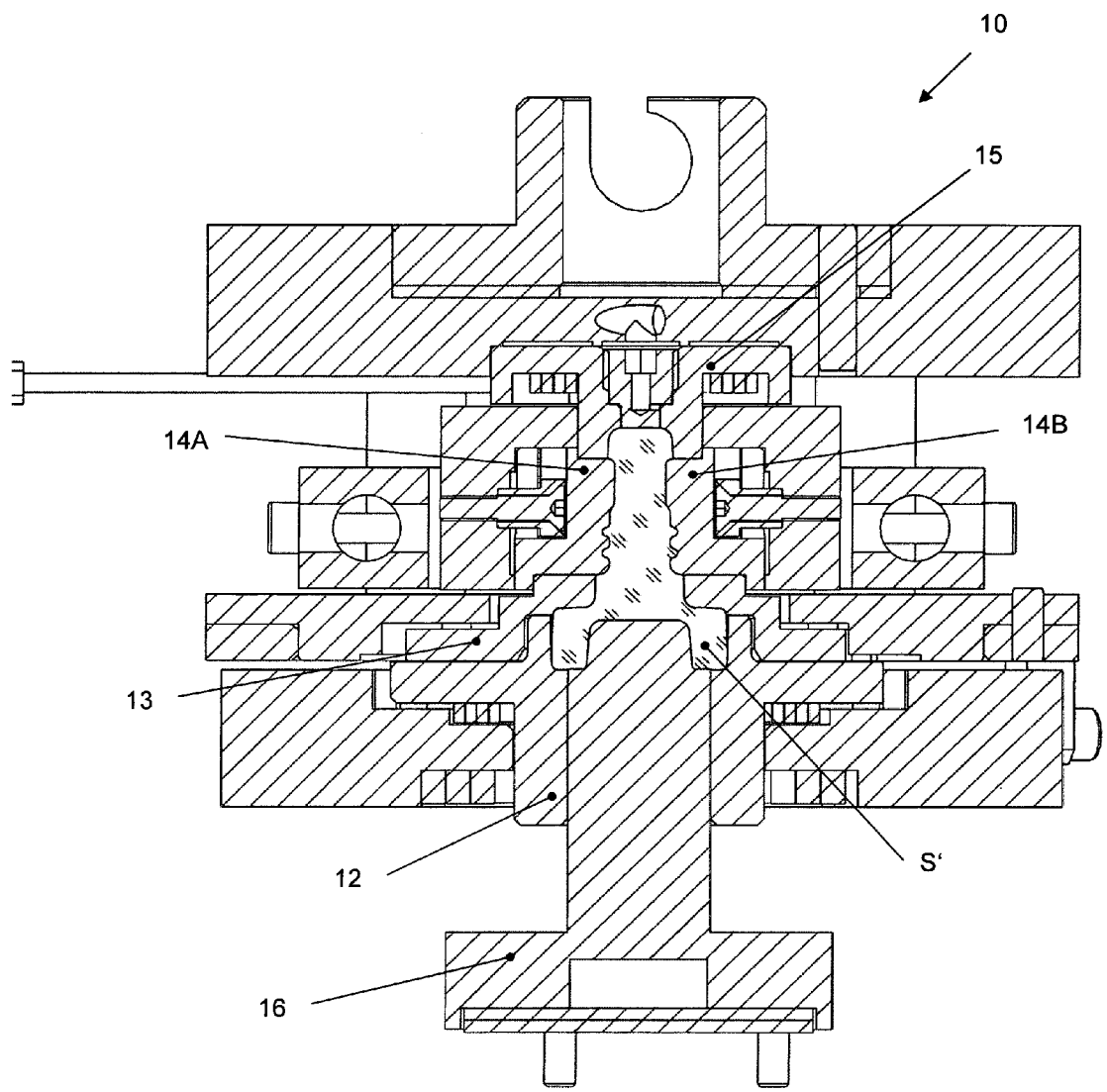
FIG. 2 shows a further example of embodiment of a closed mold entity of a multi-station press for implementing a method for the production of a glass stopper for sealing bottles and provided with a head section.
Figure 3:
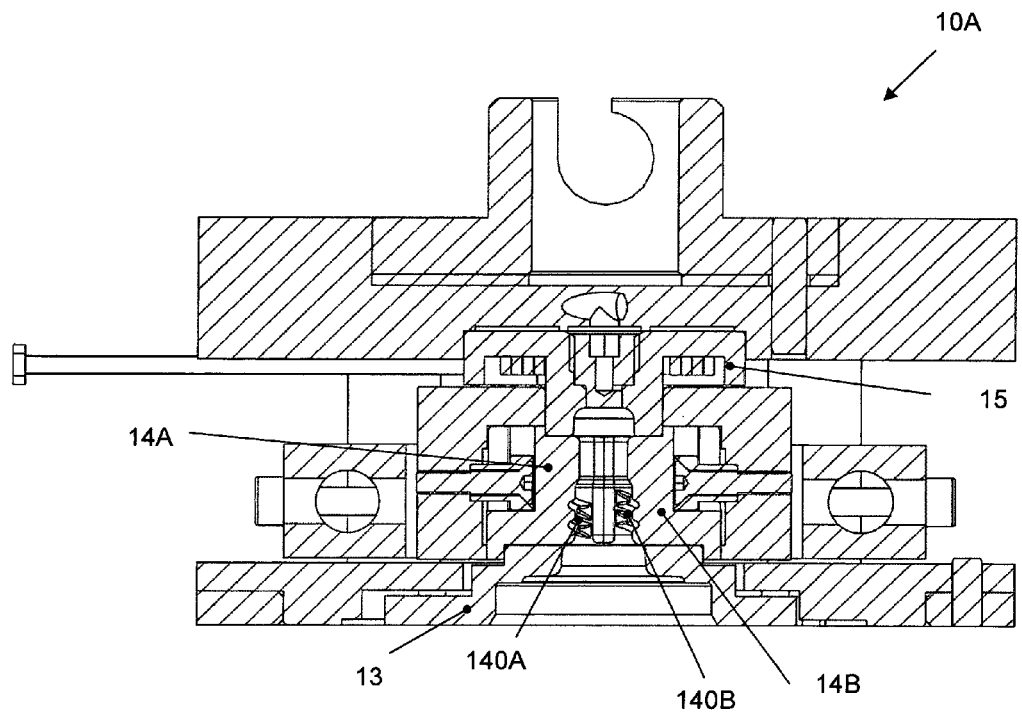
FIG. 3 shows a top mold of the mold entity according to FIG. 2.
Figure 4:
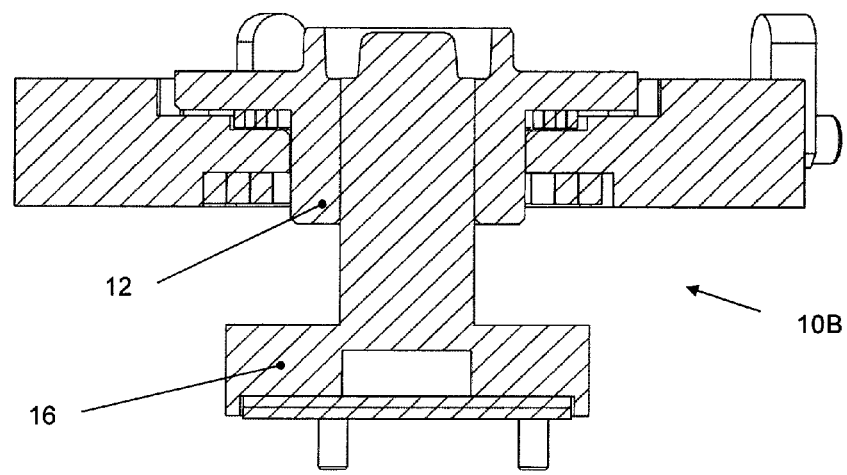
FIG. 4 shows a bottom mold of the mold entity according to FIG. 2.
Figure 5:
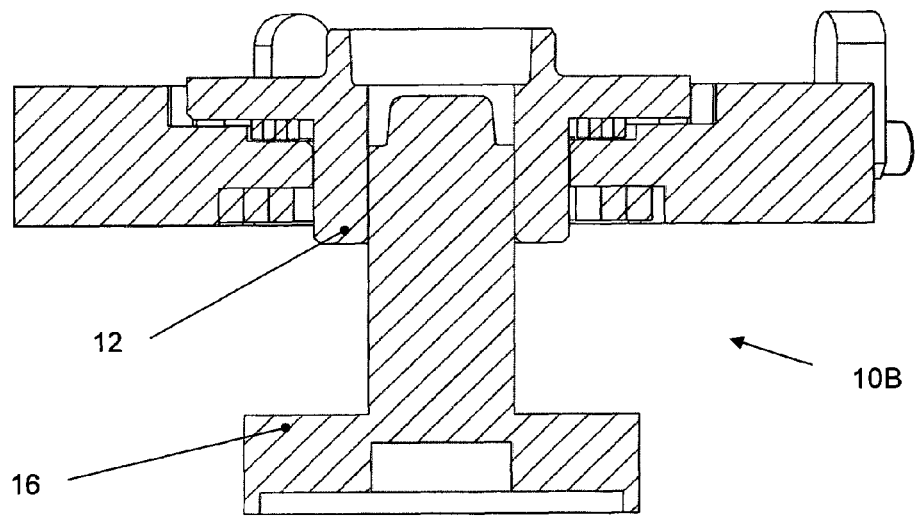
FIG. 5 shows the bottom mold according to FIG. 4 in a position immediately before adding liquid glass.
Figure 6:
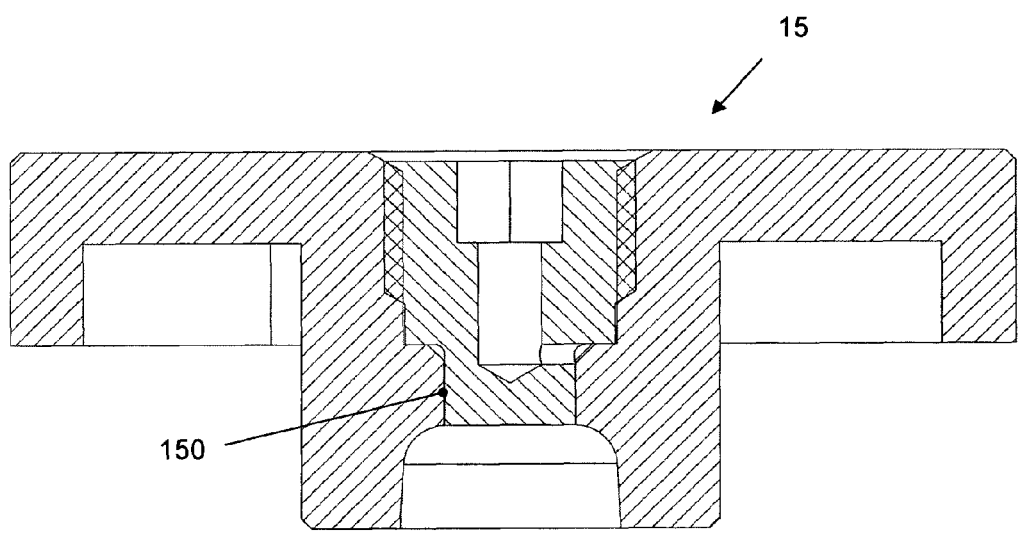
FIG. 6 shows an upper top mold piece of the top mold according to FIG. 3.

FIG. 2 shows a preferred example of embodiment of a closed total mold or mold entity 10 of and/or within a multi-station press for implementing a method for the production of a glass stopper S for the sealing of bottles, in particular of bottles for wine and sparkling wine, said bottles being provided with a head section or piece. The mold entity 10 comprises a top mold 10A represented in FIG. 3 as well as a bottom mold 10B represented in FIG. 4 and FIG. 5. The top mold 10A comprises an upper top mold piece 15 shown in FIG. 6 and mounted in a floating manner, and an annular monolithic (one-part) lower top mold piece 13 for molding a part of the stopper length of the stopper S' as well as a part of the head section of the stopper S'. The top mold 10A, moreover, comprises a medial top mold piece, arranged between the lower mold piece 13 and the upper mold piece 15, for molding a part of the length of the stopper having a fixation formation for a seal. Herein, the medial top mold piece includes a (horizontally movable) first mold piece (or mold part) 14A and a (horizontally movable) second mold piece (or mold part) 14B. The first mold piece 14A includes a thread-like indentation 140A, and the second mold piece 14B includes a thread-like indentation 140B. The indentations 140A and 140B form a negative mold for a thread-like fixation formation (for a seal) of the stopper S', said fixation formation being formed as an indentation. The upper top mold piece 15 comprises an annular gap 150, for example for generating a depression within the upper top mold piece 15 in the top mold 10A. The bottom mold 10B comprises an press ram 16 as well as an annular, sleeve-like bottom mold piece 12 for molding at least a main portion of the head section of the stopper S'. The annular bottom mold piece 12 encloses the press ram 16 which can be shifted within the annular bottom mold piece 12.

For manufacturing the glass stopper S, the mold pieces 14A and 14B are moved (horizontally) towards and (horizontally) against each other so that they result in a closed mold ring. Moreover, the press ram 16 is moved into a position with respect to the bottom mold piece as has, by way of example, been represented in FIG. 5. Thereafter, a drop of liquid glass is supplied into the bottom mold 10B. Subsequently, the top mold 10A and the bottom mold 10B are moved towards each other in a vertical direction so that they result in a closed mold ring and the lower top mold piece 13 comes to lie on the annular bottom mold piece 12, wherein, after closing the mold entity 10, a depression of between 0.1 bar and 0.5 bar is generated in the annular gap 150. Moreover, the press ram 16 is moved upwardly ((in the direction) towards the top mold) and pressed into the head section of the stopper S', in order to mold or press-mold, respectively, the stopper S' as has been represented in FIG. 2.

After exerting pressure on or blank- or press-molding, respectively, the glass stopper S', the top mold 10A and the bottom mold 10B are moved apart, wherein the glass stopper S' remains in the top mold 10A. Subsequently, the top mold 10A is moved into a position of deposition. The mold pieces 14A and 14B are moved apart and the glass stopper is discharged. It may be provided for that the discharging the glass stopper S' the depression within the annular gap 150 is substituted by normal pressure or by overpressure. Subsequently, the glass stopper S' will be provided with a seal.

The invention claimed is:

1. A method for producing a glass stopper for sealing bottles, the stopper comprising a length and a head section, wherein the length of the stopper refers to that portion of the glass stopper which is arranged within the neck of the bottle, when the glass stopper is used in accordance with its purpose, the method comprising:
   providing a bottom mold, the bottom comprising:
      a press ram; and
      an annular bottom mold piece for molding at least a portion of the head section, wherein the bottom mold piece encloses the press ram;
   providing a top mold, the top mold comprising:
      an upper top mold piece;
      an annular lower top mold piece separate and distinct from the upper top mold piece; and
      at least one medial top mold piece, the medial top mold piece being arranged between the lower top mold piece and the upper top mold piece, wherein the medial top mold piece comprises a first mold piece and at least one second mold piece;
   supplying liquid glass to the bottom mold; and
   press-molding a glass stopper for sealing bottles from the liquid glass supplied to the bottom mold by means of the bottom mold and the top mold.

2. The method as claimed in claim 1, wherein the lower top mold piece is monolithic.

3. The method as claimed in claim 1, the lower top mold piece being configured for molding a part of the length of the stopper.

4. The method as claimed in claim 1, the lower top mold piece being configured for molding at least a portion of the head section.

5. The method as claimed in claim 1, the lower top mold piece being configured for molding a part of the length of the stopper and for molding at least a portion of the head section.

6. The method as claimed in claim 3, the medial top mold piece being configured for molding a part of the length of the stopper.

7. The method as claimed in claim 3, the medial top mold piece being configured for molding at least a part of the length of the stopper having a shape configured for fixing a seal.

8. The method as claimed in claim 1, the medial top mold piece being configured for molding at least a part of the length of the stopper having a shape configured for fixing a seal.

9. The method as claimed in claim 8, before press-molding, moving the bottom mold and the top mold towards each other essentially in a vertical direction such that they form a closed mold entity.

10. The method as claimed in claim 9, while press-molding, pressing the press ram into the head section.

11. The method as claimed in claim 10, thereafter, moving the bottom mold and the top mold apart from one another.

12. The method as claimed in claim 11, thereafter, moving the first mold piece and the second mold piece apart from one another.

13. The method as claimed in claim 11, thereafter, moving the first mold piece and the second mold piece apart from one another essentially in a horizontal direction.

14. The method as claimed in claim 8, wherein the medial top mold piece is heated.

15. The method as claimed in claim 1, before press-molding, moving the bottom mold and the top mold towards each other essentially in a vertical direction such that they form a closed mold entity.

16. The method as claimed in claim 15, while press-molding, pressing the press ram into the head section.

17. The method as claimed in claim 16, thereafter, moving the bottom mold and the top mold apart from one another.

18. The method as claimed in claim 11, thereafter, moving the first mold piece and the second mold piece apart from one another essentially in a horizontal direction.

19. A method for producing a glass stopper for sealing bottles, the stopper comprising a length and a head section, wherein the length of the stopper refers to that portion of the glass stopper which is arranged within the neck of the bottle, when the glass stopper is used in accordance with its purpose, the method comprising:
providing a bottom mold, the bottom comprising:
a press ram and
an annular bottom mold piece for molding at least a main portion of the head section or a portion of the head section, wherein the bottom mold piece surrounds the press ram,
providing a top mold, the top mold comprising:
an upper top mold piece and
an annular lower top mold piece separate and distinct from the upper top mold piece for molding at least a portion of the head section,
supplying liquid glass to the bottom mold, and
press-molding a glass stopper for sealing bottles from the liquid glass supplied to the bottom mold by means of the bottom mold and the top mold.

20. The method as claimed in claim 19, the lower top mold piece being configured for molding a part of the length of the stopper.

21. The method as claimed in claim 20, before press-molding, moving the bottom mold and the top mold towards each other essentially in a vertical direction such that they form a closed mold entity.

22. The method as claimed in claim 21, while press-molding, pressing the press ram into the head section.

23. The method as claimed in claim 22, the method further comprising:
thereafter, moving the bottom mold and the top mold apart from one another;
afterwards discharging the readily molded glass stopper; and
afterwards providing the readily molded glass stopper with a monolithic seal.

* * * * *